US012337442B2

(12) United States Patent
Barezzani et al.

(10) Patent No.: US 12,337,442 B2
(45) Date of Patent: Jun. 24, 2025

(54) IMPACT TOOL

(71) Applicant: CEMBRE S.P.A., Brescia (IT)

(72) Inventors: Gualtiero Barezzani, Brescia (IT); Gianpaolo Luciani, Brescia (IT)

(73) Assignee: CEMBRE S.P.A., Brescia (IT)

( * ) Notice: Subject to any disclaimer, the term of this patent is extended or adjusted under 35 U.S.C. 154(b) by 0 days.

(21) Appl. No.: 18/549,861

(22) PCT Filed: Mar. 10, 2022

(86) PCT No.: PCT/IB2022/052144
§ 371 (c)(1),
(2) Date: Sep. 8, 2023

(87) PCT Pub. No.: WO2022/190025
PCT Pub. Date: Sep. 15, 2022

(65) Prior Publication Data

US 2024/0149407 A1 May 9, 2024

(30) Foreign Application Priority Data

Mar. 12, 2021 (IT) ........................ 102021000005933

(51) Int. Cl.
*B25B 21/02* (2006.01)
*B25B 21/00* (2006.01)
(Continued)

(52) U.S. Cl.
CPC .......... *B25B 21/02* (2013.01); *B25B 23/1475* (2013.01); *B25B 23/16* (2013.01);
(Continued)

(58) Field of Classification Search
CPC ....... B25B 21/02; B25B 23/16; B25B 21/002; B25B 23/1475; B25F 5/006; B25F 5/008
See application file for complete search history.

(56) References Cited

U.S. PATENT DOCUMENTS 6,076,616 A * 6/2000 Kramp ................. B25D 17/043
173/211
6,733,414 B2 * 5/2004 Elger ...................... B25B 21/02
173/205
(Continued)

FOREIGN PATENT DOCUMENTS

DE 102012221517 A1 5/2014
EP 0246212 A2 11/1987
(Continued)

OTHER PUBLICATIONS

International Search Report and Written Opinion received for PCT Serial No. PCT/IB2022/052144 on Jul. 8, 2022, 14 pgs.

*Primary Examiner* — Andrew M Tecco
*Assistant Examiner* — Nicholas E Igbokwe
(74) *Attorney, Agent, or Firm* — Merchant & Gould P.C.

(57) ABSTRACT

An impact wrench includes a motor unit with a motor adapted to produce a rotary motion and an operating switch for operating the motor. A tool-holder shaft rotatable about a rotation axis. A transmission unit with a percussion mechanism, connects between the motor unit and the tool-holder shaft. A handlebar structure has two manual gripping handles. An electronic control system contains at least one electronic control board connected to one or more electric batteries and to the operating switch. A damping connection system mechanically connects a transmission housing of the transmission unit to a main housing of the motor unit and the main housing to the handlebar structure. The damping connection system includes: one or more first damper elements interposed between the transmission housing and the main housing, and one or more second damper elements interposed between the main housing and the handlebar structure.

16 Claims, 6 Drawing Sheets

(51) Int. Cl.
*B25B 23/147* (2006.01)
*B25B 23/16* (2006.01)
*B25F 5/00* (2006.01)

(52) U.S. Cl.
CPC .............. *B25F 5/006* (2013.01); *B25F 5/008* (2013.01); *B25B 21/002* (2013.01)

(56) References Cited

U.S. PATENT DOCUMENTS

| | | | | |
|---|---|---|---|---|
| 2008/0098857 | A1* | 5/2008 | Myburgh | B25B 21/002 81/57.16 |
| 2014/0124230 | A1* | 5/2014 | Johnson | B25F 5/02 173/162.1 |
| 2020/0180124 | A1 | 6/2020 | Ellice | |
| 2021/0370484 | A1* | 12/2021 | Widlroither | E01B 29/28 |
| 2022/0105611 | A1* | 4/2022 | McClung | B25B 23/1475 |

FOREIGN PATENT DOCUMENTS

| | | | |
|---|---|---|---|
| GB | 2429257 | A | 2/2007 |
| WO | 2005113200 | A1 | 12/2005 |
| WO | 2019207424 | A1 | 10/2019 |
| WO | 2019228609 | A1 | 12/2019 |

* cited by examiner

IMPACT TOOL

CROSS-REFERENCE TO THE RELATED APPLICATIONS

The present application is a National Stage Filing of PCT International Application No. PCT/IB2022/052144 filed on Mar. 10, 2022, which claims priority to Italian Patent Application No. 102021000005933, filed on Mar. 12, 2021, both of which applications are incorporated herein by reference in their entirety.

TECHNICAL FIELD

The present invention relates to a portable impact wrench or nut runner with an electric motor and battery, in particular for operations of screwing and unscrewing bolts, nuts and rail screws to tracks and sleepers in the construction and maintenance of railway lines and for assembling truck wheels.

BACKGROUND

Two main applications are identifiable in railway constructions:

The realization of the joints of the tracks by means of perforated plates arranged on both sides of the perforated stem of two adjoining tracks and screwed by means of horizontal bolts, so as to form the continuous iron surface.

The anchoring of connections for tracks to sleepers by means of vertical screws. Such application requires a vertical screwing or unscrewing from the top.

The assembly or disassembly of the truck wheels consists of screwing or unscrewing the fixing nuts of the wheel in the horizontal position.

The work listed above is physically demanding and repetitive and requires postures, which can quickly tire the worker's muscles. Operations of screwing and unscrewing result in considerable acoustic noise and mechanical vibrations due to the percussion mechanism, the internal combustion engine, the reduction mechanism and interaction with friction of the bolts, nuts and screws with components to be screwed or unscrewed. Furthermore, using the wrench in varying climatic conditions and immediately at the ballast of the railway line, at times in a position resting directly thereon, at times in a vertical position, not only expose the wrench to intense mechanical stress, but also to humidity, drops and water sprays, stones and metal powders, which are inevitably present at the railway sleepers.

The noise and vibrations, combined with the weight of the wrench and also the exhaust gases of the combustion engine, create wearing conditions for the worker.

Furthermore, the mechanical vibrations and exposure to dust and humidity contribute to the deterioration of the mechanical and electrical/electronic parts of the wrench.

The heating of the wrench motor must be limited by means of forced ventilation to prevent the motor and electrical/electronic components from overheating, and to protect the operator. This requirement applies both to combustion engines and to electric motors. However, the forced ventilation sucks dust, humidity and drops of water into the housing of the wrench, thereby increasing the risk of damage to the electrical and electronic components.

Finally, the vibrations of the motor, the reducer, and the percussion mechanism move and wear out juxtaposed interfaces of the housing of the wrench and further promote the inlet of humidity, drops of water and dust into the wrench.

It is therefore the object of the present invention to provide an improved impact motor-wrench, having features such as to overcome at least some of the stated drawbacks with reference to the prior art.

BRIEF DESCRIPTION OF THE FIGURES

To better understand the invention and appreciate the advantages thereof, some non-limiting examples of embodiments will be described below with reference to the accompanying figures, in which.

DESCRIPTION OF THE MOTOR WRENCH 1

Figure 1:
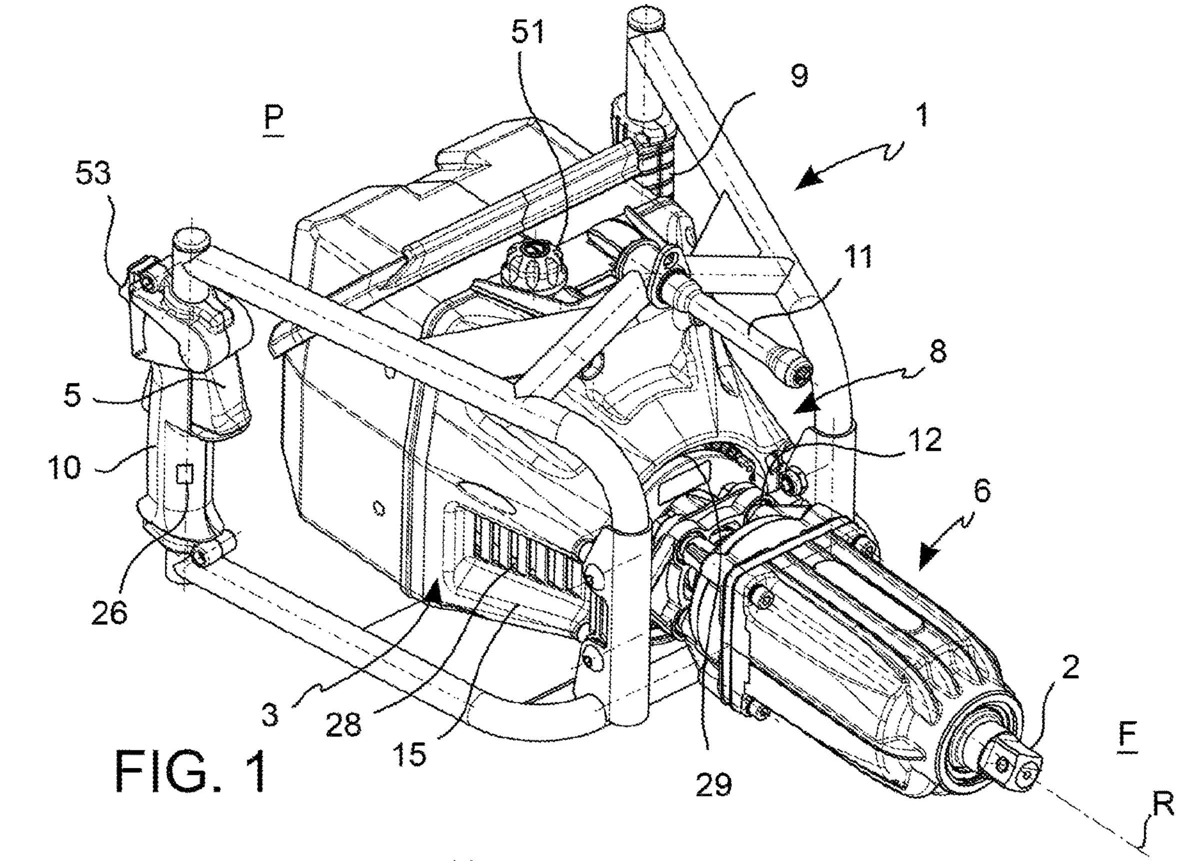
FIGS. 1 and 2 are perspective views of a motor-wrench according to an embodiment of the invention.
Figure 2:
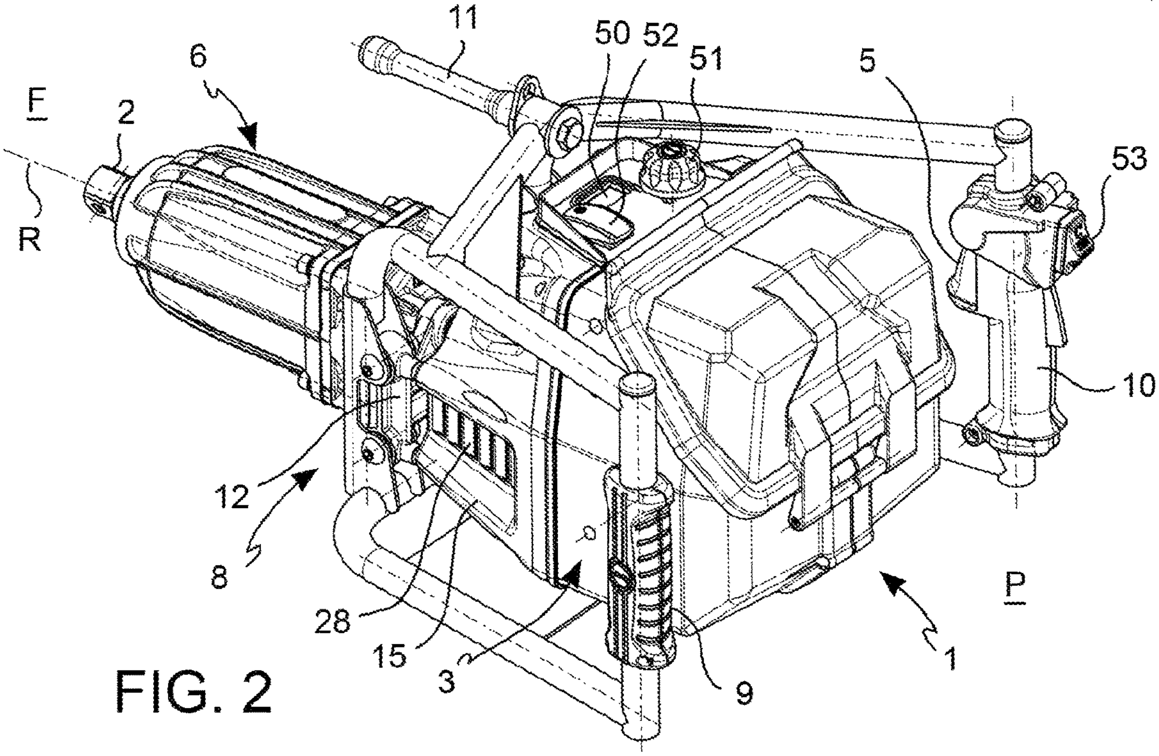
Figure 3:
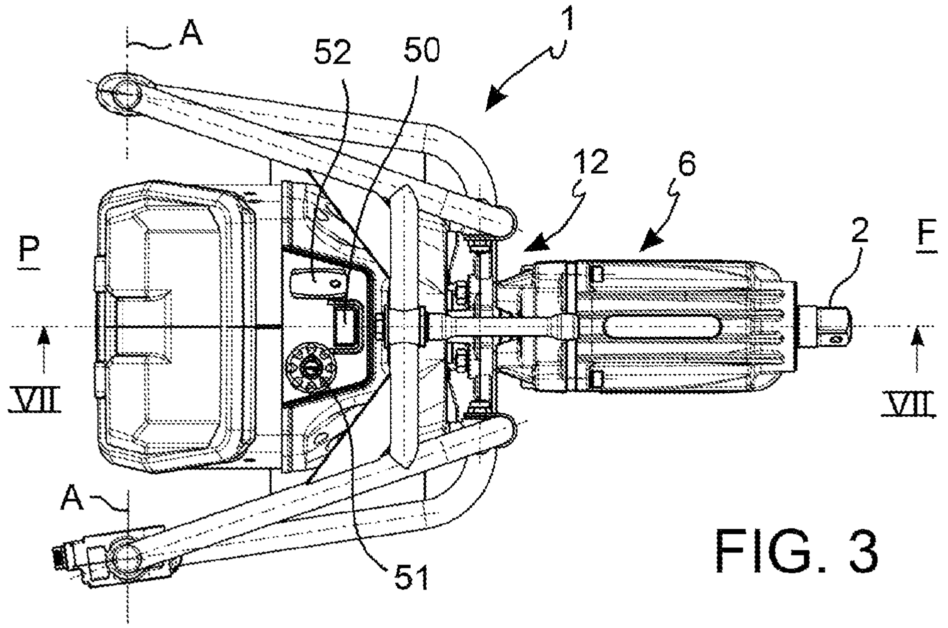
FIG. 3 is a view from above of the motor wrench in FIG. 1.
Figure 4:
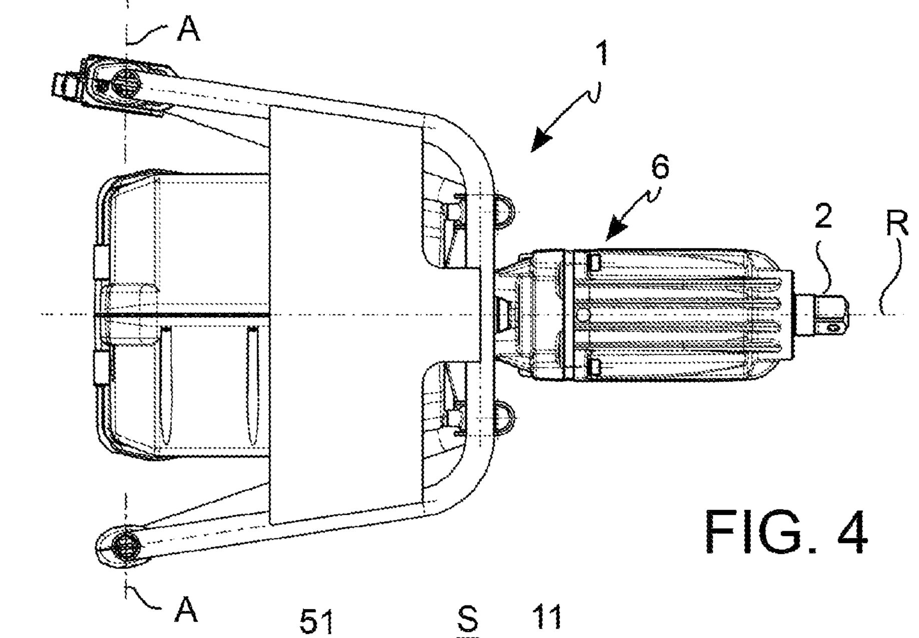
FIG. 4 is a view from below of the motor wrench in FIG. 1.
Figure 5:
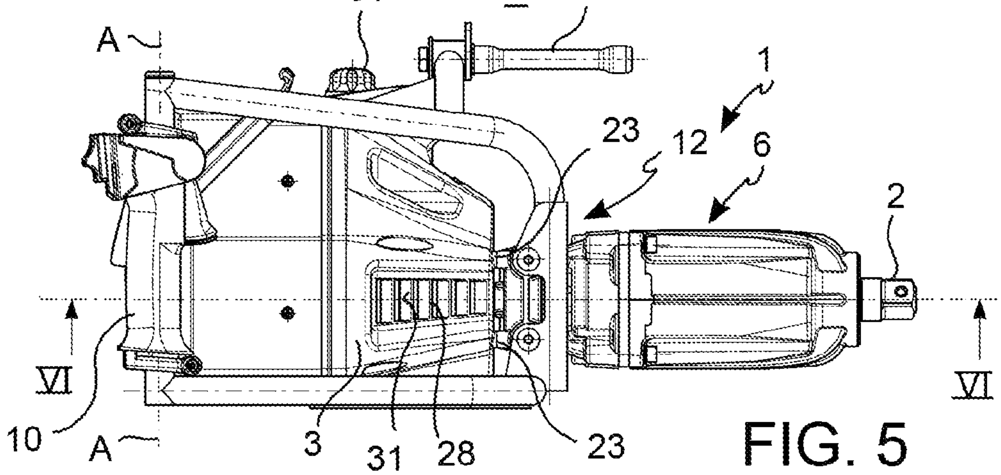
FIG. 5 is a side view of the motor wrench in FIG. 1.

With reference to the figures, a motor wrench or nut runner (hereinafter, wrench) is globally denoted with reference numeral 1 and comprises a tool-holder shaft 2, adapted to support a bush or similar tool for engaging the nuts or heads of the screws to be screwed, unscrewed. The tool-holder shaft 2 is arranged on a front side F of the wrench 1 and rotatably supported about a rotation axis R.

A motor unit 3, e.g., an electric motor 3', preferably a brushless motor, powered by one or more, preferably two electric batteries (rechargeable) 4, may be arranged in a central region, or on a rear side P of the wrench 1 opposite to the front side F and is adapted to produce the kinetic energy, in particular, the rotary motion and the couple needed for screwing/unscrewing operations. The motor unit 3 is operable and controllable by means of a manual actuation member, e.g., a button or trigger operating switch 5.

The wrench 1 further comprises a transmission unit 6 with a percussion mechanism 7 arranged between the motor unit 3 and the tool-holder shaft 2. Such transmission unit 6, e.g., a reducer mechanism, interacts with the motor 3' and the tool-holder shaft 2 so as to transmit the rotary motion (transforming the angular speed thereof and the couple) from the motor 3' to the tool-holder shaft 2 for rotating the latter about the rotation axis R.

The motor unit assembly 3, the transmission unit 6 and the percussion mechanism 7 form a base body 8 of the wrench 1, which substantially develops along the rotation axis R.

The wrench 1 further comprises two gripping handles 9, 10 secured to the base body 8. The gripping handles 9, 10 both have an elongated shape and are transversely spaced apart from each other with respect to the longitudinal extensions thereof or, in other words, they are not arranged along the same straight line. Advantageously, the two gripping handles 9, 10 are oriented so as to define a gripping plane A, which is substantially tangential to both gripping handles 9, 10 and transversal, preferably perpendicular, to the rotation axis R. The actuation member 5 of the motor 3' may be associated with one of the two gripping handles 9, 10.

The wrench 1 can further comprise an elongated-shaped auxiliary grip 11, arranged on an upper side S of the wrench 1, and spaced apart from the gripping plane A along the rotation axis R in the direction of the front side F of the wrench 1, and possibly extending parallel to the rotation axis R.

The two gripping handles 9, 10 and, if provided, the auxiliary grip 11, can form, together, a three-dimensional handlebar structure 14, which is preferably rigid in itself, and connected to the base body 8 of the wrench 1, e.g., by means of screws and by means of interposed damper elements, e.g., bushing or rubber washers (so-called anti-vibration elements).

Description of the Anti-Vibration System 12

According to one aspect of the invention, the wrench 1 comprises a damping connection system 12 (in other words, an anti-vibration system), which mechanically connects a transmission housing 13 of the transmission unit 6 (reducer and percussion mechanism) with a main housing 15 of the motor unit 3 (only electric motor 3' or with battery/batteries 4) and the main housing 15 with the handlebar structure 14 and which comprises one or more first damper elements 16, e.g. bushing or rubber washers, interposed between the transmission housing 13 and the main housing 15 and one or more second damper elements 17, e.g. bushing or rubber washers, interposed between the main housing 15 and the handlebar structure 14, so that:

- the vibrations transmitted from the transmission housing 13 to the main housing 15 are dampened by the first damper elements 16,
- the vibrations transmitted from the transmission housing 13 to the handlebar structure 14 are dampened, in sequence, by the first damper elements 16 and by the second damper elements 17,
- the vibrations transmitted from the main housing 15 to the handlebar structure 14 are dampened by the second damper elements 16.

Furthermore, the wrench 1 is devoid of rigid mechanical connections between the transmission housing 13, the main housing 15 and the handlebar structure 14 bypassing the first damper elements 16 and second damper elements 17.

The damping connection system 12 realizes two anti-vibration barriers in series between the transmission housing 13 (where the striking hammer of the percussion mechanism 7 and the reducer generate the most important mechanical vibrations and knocks) and the handlebar structure 14, which is gripped by the user, thereby protecting the user from harmful vibrations and allowing the use of the wrench 1 to be prolonged.

Furthermore, the damping connection system 12 exploits one of the two anti-vibration barriers as an anti-vibration barrier between the transmission housing 13 and the main housing 15, protecting the motor 3', the control electronics and the electrical power components, as well as the connection interfaces of single housing shells, possible displays, etc. from damage due to undesired mechanical movements, knocks and wear.

Figure 6:
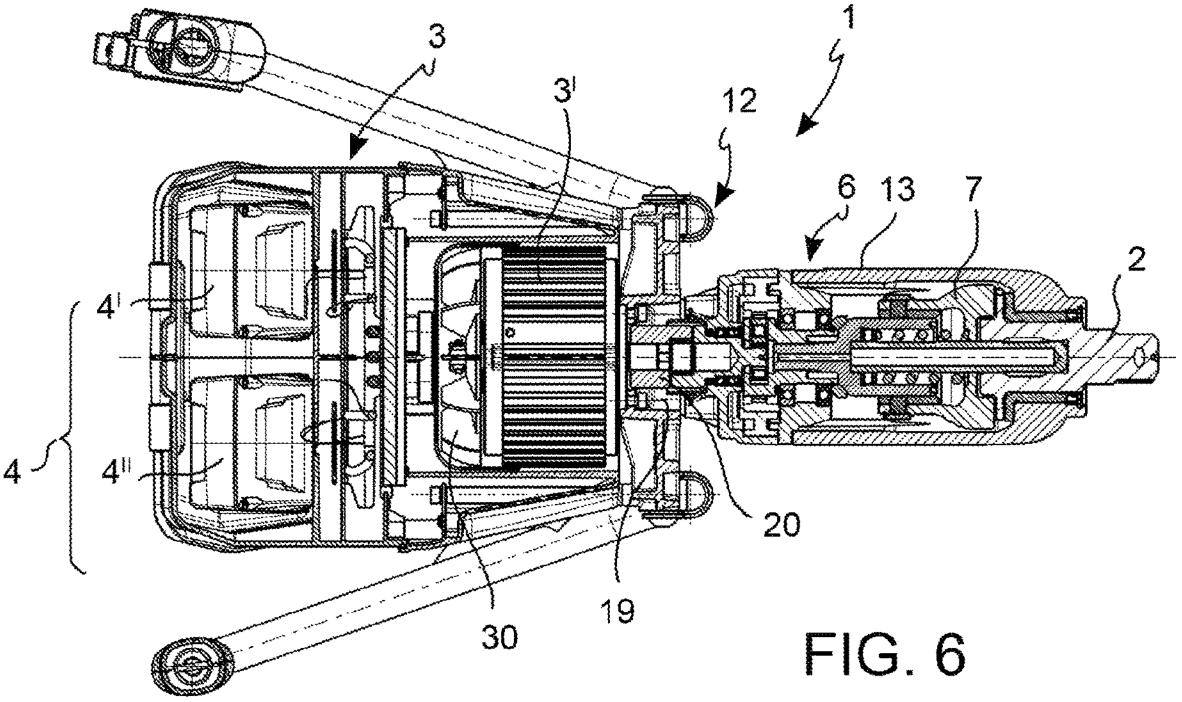
FIG. 6 is a partially sectional view, taken along the section plane VI-VI in FIG. 5.
Figure 7:
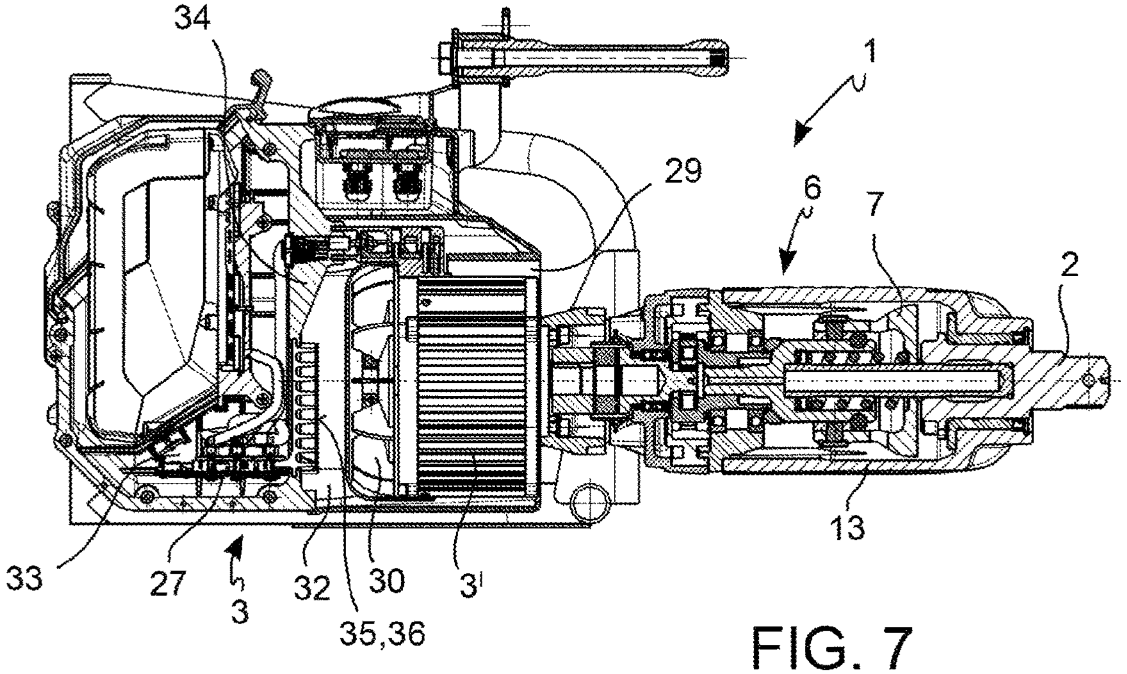
FIG. 7 is a partially sectional view, taken along the section plane VII-VII in FIG. 3.
Figure 8:
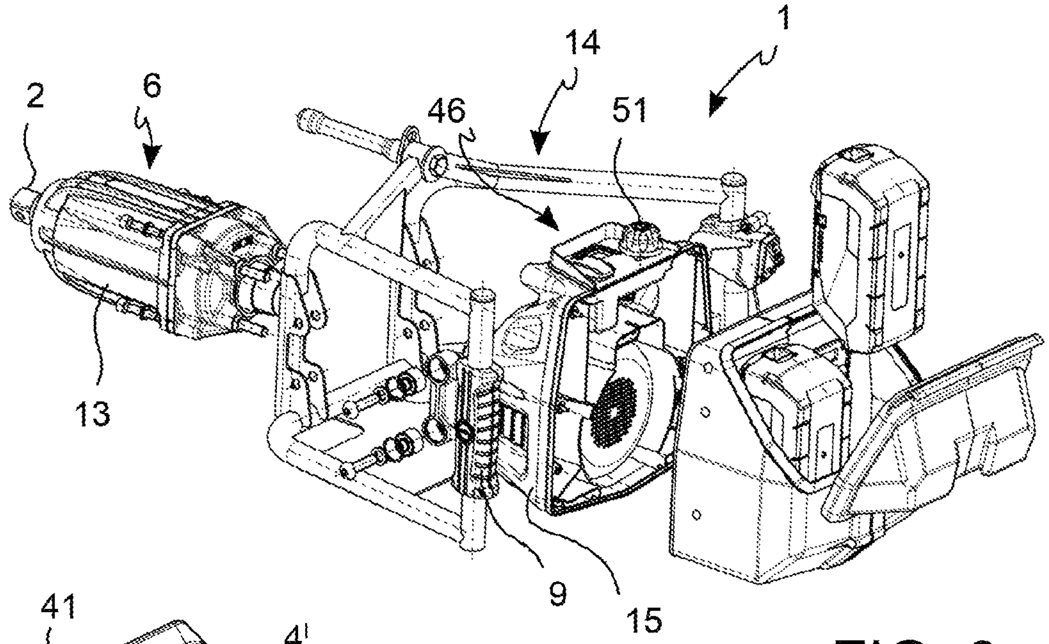
FIGS. 8 and 9 are exploded side-rear and side-front perspective views of the motor wrench in FIG. 1.
Figure 9:
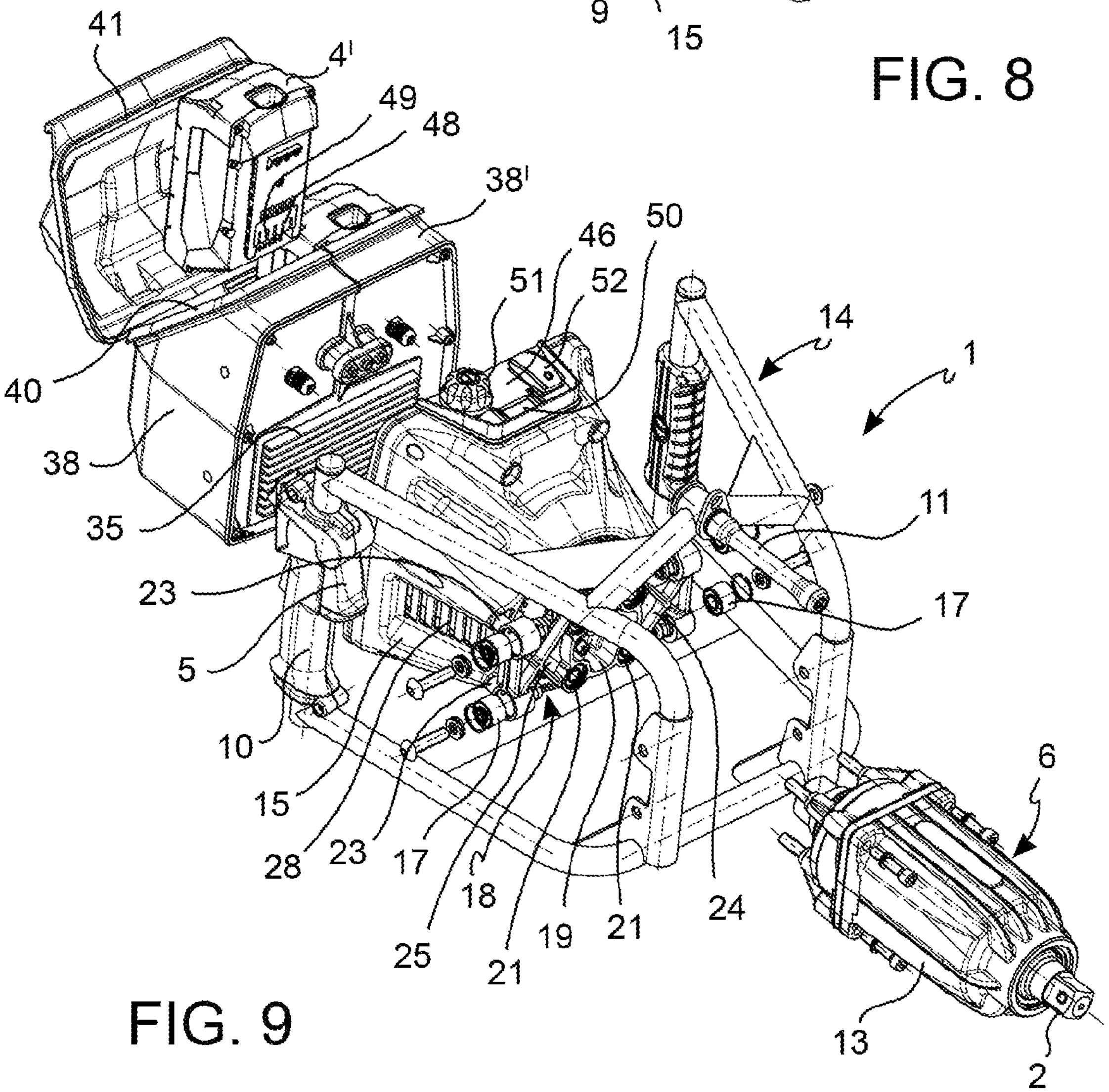

According to an embodiment, the damping connection system 12 comprises a central connection body 18, e.g., a plate or a rigid frame (FIGS. 6, 10), preferably made of metal (aluminum or steel), positioned between the motor unit 3 and the transmission unit 6, and which forms:

- an opening or passage cavity 19 for the passage of a transmission member (crank shaft or drive shaft) 20 between the motor 3' and the transmission unit 6,
- a plurality of first connection seats 21 (preferably connection holes with damping seats) for connecting, for example, by means of screws, the central connection body 18 to the transmission housing 13, by means of interposing the first damper elements 16,
- a plurality of first connection seats 22 (preferably connection holes with damping seats) for connecting, for example, by means of screws, the central connection body 18 to the handlebar structure 14, by means of interposing the first damper elements 17, and possibly
- a plurality of third connection seats 23 (preferably connection holes) for connecting, for example, by means of screws, the central connection body 18 to the main housing 15.

As an alternative to the third connection seats 23, the central connection body 18 may be made in one piece with the main housing 15.

According to an embodiment, the first connection seats 21 each comprise a hole for inserting a screw or a connection pin, and a cylindrical seat or flange for at least partially housing one of the first damper elements 16, respectively.

Advantageously, there are provided three or more, preferably four, first connection seats 21 positioned about the and at a distance from the rotation axis R.

According to an embodiment, the second connection seats 21 each comprise a hole for inserting a screw or a connection pin, and a cylindrical seat or flange for at least partially housing one of the second damper elements 17, respectively.

Advantageously, there are provided three or more, preferably four second connection seats 22 positioned about the and at a distance from the rotation axis R.

Figure 10:
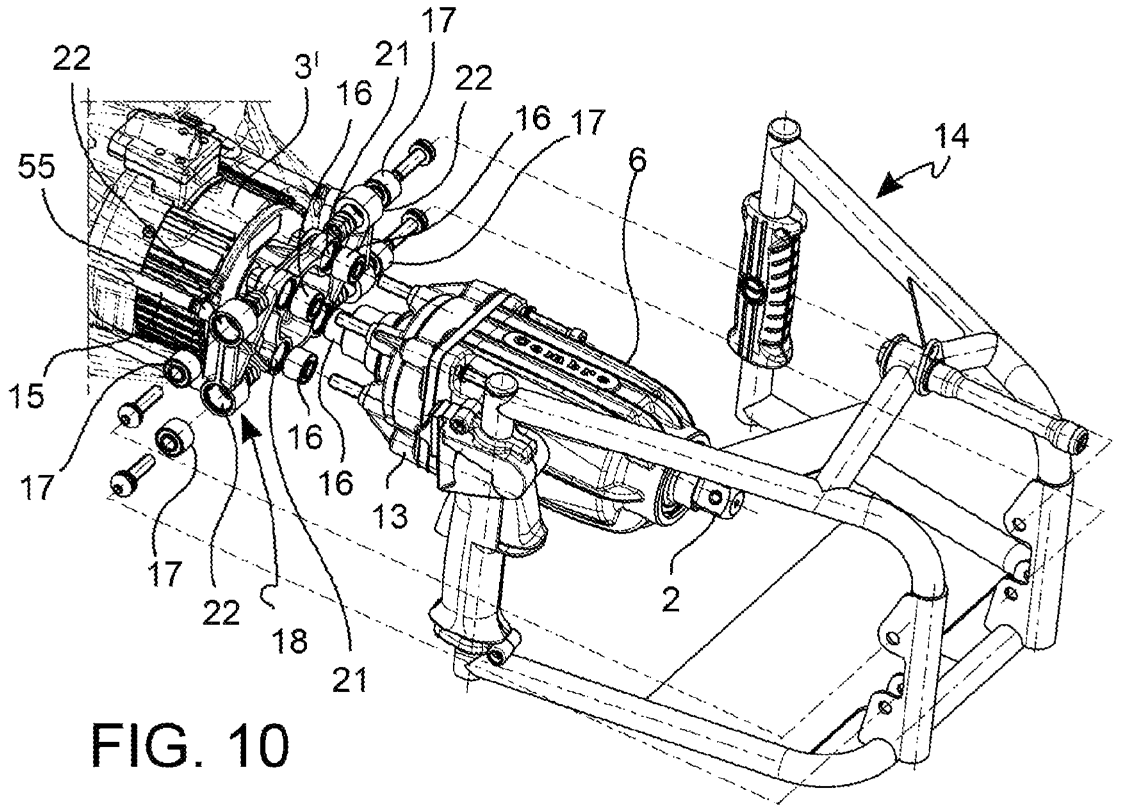
FIG. 10 is an exploded perspective view of an anti-vibration connection detail of the motor wrench according to an embodiment.
Figure 11:
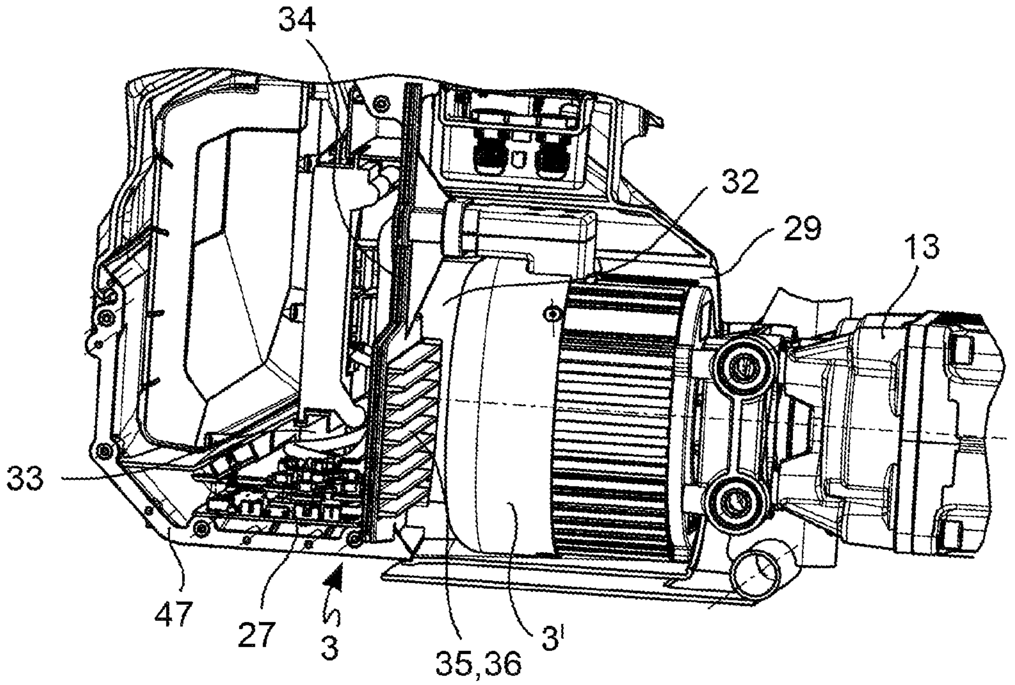
FIG. 11 is a view of a detail of the housing of the motor wrench, showing a separation by means of a radiator wall (heat sink) between an electronic-battery compartment and a motor compartment, according to an embodiment.
Figure 12:
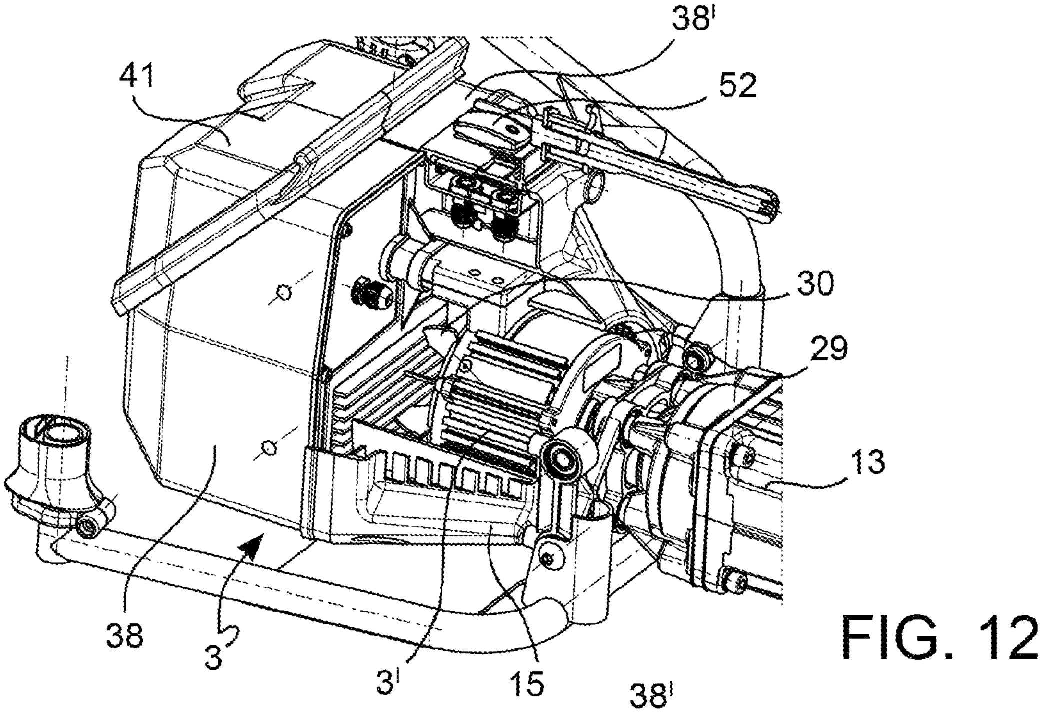
FIG. 12 shows a detail of a motor compartment of the housing of the motor wrench according to an embodiment.
Figure 13:
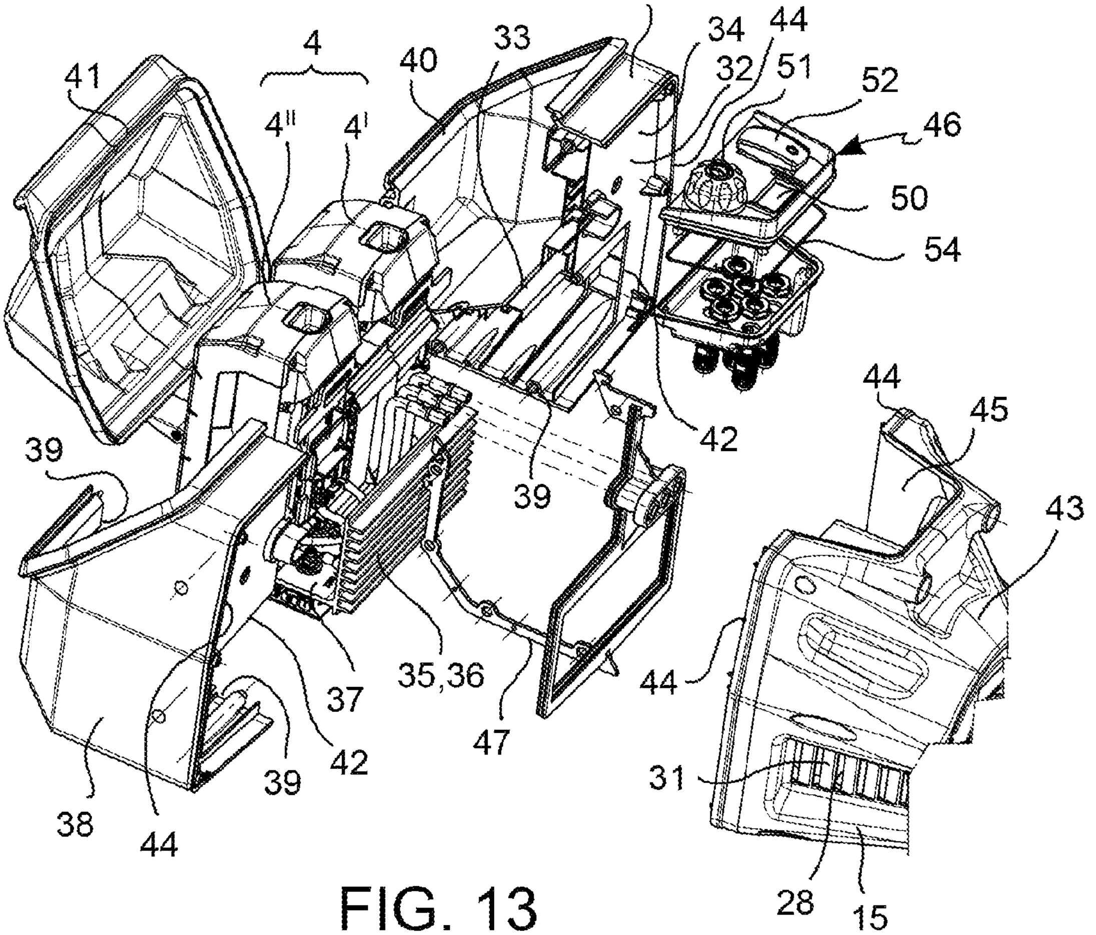
FIG. 13 is an exploded perspective view of the housing of the motor wrench, showing single housing shells, the connection interfaces of the single shells and sealing gaskets, according to an embodiment.

The second connection seats 22 are made at a distance from one another and from the first connection seats. Advantageously, the orientation (e.g., the screw/pin insertion axis) of the second connection seats 22 is transversal, preferably perpendicular, to the orientation of the first connection seats 21. For example, the first connection seats 21 may be oriented parallel to the rotation axis R and the second connection seats may be oriented perpendicular to the rotation axis R (FIG. 10).

According to a further embodiment, the orientation of the second connection seats (22) is parallel to the orientation of the first connection seats (21), e.g., parallel to the rotation axis (R). Alternatively, the first connection seats (21) and/or the second connection seats (22) are oriented perpendicular to the rotation axis (R).

According to an embodiment, the third connection seats 23 each comprise a hole for inserting a screw or connection pin and preferably, they are oriented parallel to the rotation axis R.

The central connection body 18 may comprise stiffening ribbing 24 and lightening openings 25.

According to a further embodiment, the damping connection system 12 comprises one or more third damper elements 55, e.g., bushing or rubber washers, interposed between the central connection body 18 and the main housing 15, so that:

- the vibrations transmitted from the central connection body 18 to the main housing 15 are dampened by the third damper elements 55,
- the vibrations transmitted from the transmission housing 13 to the main housing 15 are dampened, in sequence, by the first damper elements 16 and by the third damper elements 55,
- the vibrations transmitted from the main housing 15 to the handlebar structure 14 are dampened, in sequence, by the third damper elements 55 and the second damper elements 16.

According to an embodiment, the third connection seats 23 of the central connection body 18 each comprise a hole for inserting a screw or a connection pin, and a cylindrical seat or flange for at least partially housing one of the third damper elements 55, respectively.

According to an embodiment, the wrench 1 comprises a vibration sensor 26, such as an accelerometer, placed and configured to detect the vibrations of the handlebar structure 14 and in signal connection with an electronic control system 27 of the wrench 1.

Preferably, the vibration sensor 26 is positioned at one of the gripping handles 9, 10.

The electronic control system 27 is configured to generate notifications (e.g., symbolic, chromatic, alphanumerical, acoustic or numerical, residual usage time or permissible excess usage time), depending on the detected vibration values and the operation time to which the detected vibration values refer, as well as predetermined exposure limits.

For example, the electronic control system 27 is configured to:

- correlate vibration values detected by the vibration sensor 26 with the operating time of the wrench 1, i.e., with the duration of the vibrations detected, and
- compare the detected vibration values and the duration of the detected vibrations with predetermined and indicative reference time and/or vibration values for permissible intervals of exposure, for example, prescribed in regulations for safety at work.

According to an embodiment, the electronic control system 27:

- calculates the intensity (or module) of an acceleration vector, based on acceleration vector components detected by the vibration sensor 26,
- calculates a mean value or a root mean square value of the acceleration vector modules,
- compares the mean value or the root mean square value and the duration time of the detected vibration, with vibration values of reference and associated values of indicative and predetermined reference time for permissible intervals of exposure, e.g., prescribed for regulations on safety at work.

Preferably, the electronic control system 27 filters the detected vibration values, by excluding, from the processing, the vibrations having a frequency higher than a predetermined threshold of harmlessness for the user.

According to a further embodiment, the electronic control system 27 compares features (intensity and/or frequency of the acceleration) of the detected vibrations with predetermined reference intervals, which are indicative for correct operation of the wrench 1 and, in the event of the features of the detected vibrations departing from the predetermined reference intervals, it generates a fault warning.

Advantageously, this comparison takes into consideration (e.g., by means of using different predetermined reference intervals depending on) the level of torque set by the user (for example, by means of the torque selection switch 51, which will be described later on).

Detailed Description of the Ventilation System and Sealing

The screw-driver 1 comprises a cooling fan 30 for the motor 3' configured to be activated together with the operation of the motor 3', sucking ambient air through an inlet opening (grid) 28 formed in the main housing 15, conveying the sucked ambient air through, or along the motor 3' and expelling the air through an outlet opening (grid) 29 into the environment.

Advantageously, the cooling fan 30 is directly connected to a rotor of the motor 3' on one side facing the rear side P of the wrench 1.

Preferably, the inlet opening (grid) 28 is positioned on two opposite lateral sides of the main housing 15 and can comprise inlet guide surfaces 31, which direct the sucked air flow inside the main housing 15 towards the rear side P of the wrench 1 and towards the separation wall (34).

Preferably, the outlet opening (grid) 29 is positioned on a front side of the main housing facing towards the front side F of the wrench 1 and can have, for example, an annular-slit shape through which the cooling air flow is expelled in the front axial direction. In this way, the expelled air flow removes, from the main housing (15), the dust dispersed or the swarf scraped during the screwing/unscrewing.

According to one aspect of the invention, the motor 3' is housed inside a special motor compartment 32 of the main housing 15 and at least one heat-sensitive part of the electronic control system 27, in particular, an electronic control board, or substantially the whole electronic control system 27, possibly together with the one or more electric batteries 4, is housed inside a protected compartment 33.

The protected compartment 33 borders directly, but is not in communication, with the motor compartment 32 and is separated from the motor compartment 32 by means of a separation wall 34. The cooling fan 30 conveys the cooling air flow into the only motor compartment 32 along the separation wall 34, which forms a metal radiator (heat sink) 35 in relation of heat exchange with the heat-sensitive part of the electronic control system 27, in particular, with the electronic control board in the protected compartment 33 (FIGS. 9, 11-13).

In this way, it is possible to cool the motor 3' and the heat-sensitive electrical and electronic components without the dust, humidity and possible drops of water carried with the cooling air flow, coming into contact with the electrical and electronic components of the electronic control system 27. This ensures an high level of waterproofing and a reliable use of the wrench 1 also in unfavorable weather conditions and in the presence of dust.

Advantageously, the protected compartment 33 accommodates both the electronic board of the control system 27 and the one or more batteries 4 for the power supply therein.

According to an embodiment, the metal radiator 35 forms a plurality of cooling fins 36 protruding into the motor compartment 32 and directly touched by the cooling air flow.

According to a further embodiment, the metal radiator 35 forms a plate-shaped protrusion 37 extending into the protected compartment 33 and in direct contact with the electronic board of the control system 27.

According to a further embodiment, the main housing 15 forms said motor compartment 32 and said protected compartment 33 and comprises:

two opposite side shells 38, 38', e.g., made of plastic, mutually arranged side by side along first contact interfaces 39, preferably in a plane parallel to the rotation axis R, and defining together the protected compartment 33, a rear opening 40 for accessing the protected compartment 33, which is closable by means of a rear cover 41, preferably elastomeric, and the separation wall 34 with a radiator seat 42 for accommodating the metal radiator 35, a front shell 43, preferably made of plastic, placed next to the side shells 38, 38' along second contact interfaces 44, preferably in a plane orthogonal to the rotation axis R, and defining together with the side shells 38, 38' the motor compartment 32 and, possibly, a control seat 45 for housing a user control panel 46.

A first gasket 47, preferably made in a single piece, extends along the first contact interfaces 39 and along the radiator seat 42 (and about the metal radiator 35 accommodated therein).

A second gasket 54, preferably made in a single piece, may be extended along the control seat 45 or at the control panel 46 accommodated therein.

A further gasket may be extended along the second contact interfaces 44, but such further gasket is not essential, as the motor compartment 32 is nonetheless in communication with the external environment.

In this way, an elevated level of protection is obtained from dust, humidity and drops of water and the first contact surfaces 39, in turn, are locally dampened and protected from the harmful effects of the mechanical vibrations.

Advantageously, the rear cover 41 is made of elastomeric material, or with an elastomeric edge, so as to be elastically fittable on a protruding edge of the rear access opening 40.

The rear cover 41 may be unlosably hinged to the main housing 15.

Description of the Power Supply by Means of Two Batteries 4

According to a further aspect of the invention, the electric motor 3', e.g., a synchronous brushless motor with permanent magnets and with an integrated control unit and battery powered 36 Volt DC, is simultaneously powered by two rechargeable batteries 4, preferably connected parallel to each other, e.g., lithium-ion batteries, voltage 36 V, 8 Ah or higher, housed together in the protected compartment 33 of the main housing 15.

The electronic control system 27 comprises a device for generating the current supplied to the motor 3' (e.g., obtained by means of MOSFET) configured to utilize a first battery of the batteries 4 for generating a first phase, a second battery of the batteries 4 for generating a second phase, and both batteries 4 for generating a third phase of a three-phase current, wherein the ratio of the contributions of the first battery and the second battery to the generation of the third phase is determined depending on the residual charge state of the batteries 4. In particular, the least charged battery contributes less to the generation of the third phase than the most charged battery.

The current supplied to the electric motor 3' is greater than the current, which may be supplied by only one of the two batteries 4.

In addition to the main supply contacts 48, the batteries 4 comprise auxiliary contacts for controlling the battery operating conditions. The electronic control system 27 recognizes the type of battery used by detecting an electrical resistance between the auxiliary contacts.

The wrench 1 further comprises a display 50, which can form part of the user control panel 46, for displaying the state of charge of the batteries 4. In order to prevent damage to the motor 3' (stall) due to too low a level of the supply voltage, the control system 27 is configured to detect a flat battery state, e.g., by detecting a flat battery signal at the auxiliary contacts 49 or by detecting the battery 4 voltage and comparing the detected voltage with a predetermined minimum threshold value as a function of the type of battery used.

When the control system 27 determines the "flat battery" state, it controls the wrench 1 to complete a possibly ongoing screwing cycle and prevents successive operations, or it prevents any further operation until establishing sufficient electrical voltage (after replacing or recharging the batteries 4).

Description of Wrench 1—User Interaction

According to an embodiment, the wrench 1, preferably, the user control panel 46 formed at the main housing 15, comprises an electric torque selection switch 51 in connection with the control system 27, for allowing the selection of a plurality of, for example, 5 values or levels of torque in the range of torque transmissible by the wrench 1. For example, the maximum transmissible torque may be equal to 2700 Nm. The control system 27 controls the rotational speed of the motor 3' as a function of the selected torque level or value. The rotational speed of the motor 3' determines the rotational impact intensity of the percussion mechanism 7 and, consequently, the transmissible torque.

The torque selection switch 51 can comprise a rotational switch, possibly with Hall sensor and digital coding of the angular selection position.

The wrench 1, preferably, the user control panel 46, further comprises a main switch 52, e.g., an unstable balancer, in connection with and for switching on and off the control system 27.

The wrench 1 further comprises a direction selection switch 53, e.g., a switch with a stable slide, with two positions, in connection with the control system 27, for selecting the direction of rotation of the motor 3' for screwing and unscrewing. Advantageously, the direction selection switch 53 is positioned at one of the gripping handles 9, 10.

The wrench 1 further comprises an operating switch 5, e.g., an unstable switch, with a button or a trigger, in connection with the control system 27, for activating the rotation of the motor 3'. Advantageously, the operating switch 5 is positioned at the same gripping handle 9, to which the direction selection switch is connected 53.

In order to reduce the risk of an accident to a minimum, the electronic control system 27 is configured to automatically brake the motor 3', e.g., by means of electromagnetic braking, upon releasing the operating switch 5.

The wrench 1 is suitable for screwing and unscrewing nuts/screws of different sizes, both on railway sleepers, made of different materials, (wood, cement, plastic) and on metal plates for joining tracks, for assembling/disassembling truck wheels, in the oil and mining industry, in construction and for forestry works and various kinds of emergency interventions.

The invention claimed is:

1. An impact nut runner or wrench comprising:

a motor unit with a motor adapted to produce a rotary motion, and an operating switch for actuating the motor, a tool-holder shaft which is rotatable about a rotation axis, a transmission unit with a percussion mechanism connected between the motor unit and the tool-holder shaft, a handlebar structure with two gripping handles for manually gripping the wrench, wherein the transmission unit interacts with the motor and with the tool-holder shaft to transmit the rotary motion from the motor to the tool-holder shaft for rotating the tool-holder shaft about the rotation axis, an electronic control system containing at least one electronic control board, connected to one or more electric batteries and to the operating switch, a damping connection system which mechanically connects a transmission housing of the transmission unit to a main housing of the motor unit and the main housing to the handlebar structure and which comprises:

one or more first damper elements interposed between the transmission housing and the main housing, and one or more second damper elements interposed between the main housing and the handlebar structure, so that:

vibrations transmitted from the transmission housing to the main housing are dampened by the first damper elements, vibrations transmitted from the transmission housing to the handlebar structure are dampened, in sequence, by the first damper elements and by the second damper elements, vibrations transmitted from the main housing to the handlebar structure are dampened by the second damper elements, wherein the damping connection system comprises a central connection body placed between the motor unit and the transmission unit and forming:

a passage cavity for a transmission member to pass from the motor to the transmission unit, a plurality of first connection seats for a first connection of the central connection body with the transmission housing, by interposition of the first damper elements, a plurality of second connection seats for a second connection of the central connection body with the handlebar structure, by interposition of the second damper elements, a plurality of third connection seats for a third connection of the central connection body with the main housing.

2. A wrench according to claim 1, wherein the first damper elements comprise rubber bushings and the second damper elements comprise rubber bushings.

3. A wrench according to claim 1, wherein the central connection body comprises a plate or a rigid metal frame, the first connection seats form first connection holes with first damper seats for the first connection by one or more screws, the second connection seats form second connection holes with second damper seats for the second connection by one or more screws, and the third connection seats form third connection holes for the third connection by one or more screws.

4. A wrench according to claim 1, comprising:

four first connection seats placed about and at a distance from the rotation axis, four second connection seats placed about and at a distance from the rotation axis.

5. A wrench according to claim 1, wherein the second connection seats are formed at a distance from one another and from the first connection seats and:

an orientation of the second connection seats is transverse to an orientation of the first connection seats, or the orientation of the second connection seats is parallel to the orientation of the first connection seats, or the first connection seats and/or the second connection seats are oriented parallel to the rotation axis, or the first connection seats and/or the second connection seats are oriented perpendicular to the rotation axis.

6. A wrench according to claim 1, wherein the central connection body comprises stiffening ribs and lightening openings.

7. A wrench according to claim 1, comprising a vibration sensor placed and configured to detect vibrations of the handlebar structure and in signal connection with the electronic control system of the wrench, wherein the electronic control system is configured to generate residual usage time warnings or allowable usage time exceeded warnings, depending on detected vibration values and operation time to which the detected vibration values refer, and on predetermined exposure limits.

8. A wrench according to claim 1, comprising:

an electric torque selection switch in connection with the control system of the wrench, to allow selection of a plurality of levels of transmissible torque, wherein the control system controls rotational speed of the motor as a function of the selected torque level, a main switch in connection with and for switching on and off the control system, a direction selection switch in connection with the control system for selecting rotation direction of the motor, said direction selection switch being placed at one of the gripping handles, an operating switch in connection with the control system for activating the rotation of the motor, said operating switch being placed at the gripping handle to which the direction selection switch is connected.

9. A wrench according to claim 1, wherein the electronic control system is configured to automatically brake the motor.

10. A wrench according to claim 1, wherein the electronic control system is configured to automatically brake the motor through electromagnetic braking upon releasing the operating switch.

11. A wrench according to claim 1, comprising:

an electric torque selection switch in connection with the control system of the wrench, to allow selection of five levels of transmissible torque, wherein the control system controls the rotational speed of the motor as a function of the selected torque level, a main switch in connection with and for switching on and off the control system, a direction selection switch in connection with the control system for selecting rotation direction of the motor, said direction selection switch being placed at one of the gripping handles, an operating switch in connection with the control system for activating the rotation of the motor, said operating switch being placed at the gripping handle to which the direction selection switch is connected.

12. A wrench according to claim 1, comprising an accelerometer placed and configured to detect the vibrations of the handlebar structure and in signal connection with the electronic control system of the wrench, wherein the electronic control system is configured to generate residual usage time warnings or allowable usage time exceeded warnings, depending on the detected vibration values and the operation time to which the detected vibration values refer, as well as on predetermined exposure limits.

13. An impact nut runner or wrench comprising:

a motor unit with a motor adapted to produce a rotary motion, and an operating switch for actuating the motor, a tool-holder shaft which is rotatable about a rotation axis, a transmission unit with a percussion mechanism connected between the motor unit and the tool-holder shaft, a handlebar structure with two gripping handles for manually gripping the wrench, wherein the transmission unit interacts with the motor and with the tool-holder shaft to transmit the rotary motion from the motor to the tool-holder shaft for rotating the tool-holder shaft about the rotation axis, an electronic control system containing at least one electronic control board, connected to one or more electric batteries and to the operating switch, a damping connection system which mechanically connects a transmission housing of the transmission unit to a main housing of the motor unit and the main housing to the handlebar structure and which comprises:

one or more first damper elements interposed between the transmission housing and the main housing, and one or more second damper elements interposed between the main housing and the handlebar structure, so that:

vibrations transmitted from the transmission housing to the main housing are dampened by the first damper elements, vibrations transmitted from the transmission housing to the handlebar structure are dampened, in sequence, by the first damper elements and by the second damper elements, vibrations transmitted from the main housing to the handlebar structure are dampened by the second damper elements;

a vibration sensor placed and configured to detect vibrations of the wrench and in signal connection with the electronic control system of the wrench, wherein the electronic control system performs a comparison of features of the detected vibrations to predetermined reference ranges, which are indicative for a correct operation of the wrench and, if the features of the detected vibrations deviate from the predetermined reference ranges, the electronic control system generates a fault warning.

14. A wrench according to claim 13, wherein the electronic control system uses reference ranges that are predetermined but different depending on torque level set by a user.

15. An impact nut runner or wrench comprising:

a motor unit with a motor adapted to produce a rotary motion, and an operating switch for actuating the motor, a tool-holder shaft which is rotatable about a rotation axis, a transmission unit with a percussion mechanism connected between the motor unit and the tool-holder shaft, a handlebar structure with two gripping handles for manually gripping the wrench, wherein the transmission unit interacts with the motor and with the tool-holder shaft to transmit the rotary motion from the motor to the tool-holder shaft for rotating the tool-holder shaft about the rotation axis, an electronic control system containing at least one electronic control board, connected to one or more electric batteries and to the operating switch, a damping connection system which mechanically connects a transmission housing of the transmission unit to a main housing of the motor unit and the main housing to the handlebar structure and which comprises:

one or more first damper elements interposed between the transmission housing and the main housing, and one or more second damper elements interposed between the main housing and the handlebar structure, so that:

vibrations transmitted from the transmission housing to the main housing are dampened by the first damper elements, vibrations transmitted from the transmission housing to the handlebar structure are dampened, in sequence, by the first damper elements and by the second damper elements, vibrations transmitted from the main housing to the handlebar structure are dampened by the second damper elements;

a cooling fan for the motor configured to be activated together with operation of the motor for sucking ambient air through an air inlet opening formed in the main housing, conveying the sucked air along the motor, and expelling the conveyed air through an air outlet opening formed in the main housing, wherein:

the motor is accommodated inside a motor compartment of the main housing, and at least one heat sensitive part of the electronic control system, containing at least one electronic control board, is accommodated inside a protected compartment of the main housing, the protected compartment borders directly on the motor compartment and is separated from the motor compartment by a separation wall, and the cooling fan conveys cooling air only into the motor compartment also along the separation wall, the separation wall comprises a metal radiator directly facing into the motor compartment and in a heat exchange relationship with the heat sensitive part of the electronic control system in the protected compartment.

16. An impact nut runner or wrench comprising:

a motor unit with a motor adapted to produce a rotary motion, and an operating switch for actuating the motor, a tool-holder shaft which is rotatable about a rotation axis, a transmission unit with a percussion mechanism connected between the motor unit and the tool-holder shaft, a handlebar structure with two gripping handles for manually gripping the wrench, wherein the transmission unit interacts with the motor and with the tool-holder shaft to transmit the rotary motion from the motor to the tool-holder shaft for rotating the tool-holder shaft about the rotation axis, an electronic control system containing at least one electronic control board, connected to one or more electric batteries and to the operating switch, a damping connection system which mechanically connects a transmission housing of the transmission unit to a main housing of the motor unit and the main housing to the handlebar structure and which comprises:

one or more first damper elements interposed between the transmission housing and the main housing, and one or more second damper elements interposed between the main housing and the handlebar structure, so that:

vibrations transmitted from the transmission housing to the main housing are dampened by the first damper elements, vibrations transmitted from the transmission housing to the handlebar structure are dampened, in sequence, by the first damper elements and by the second damper elements, vibrations transmitted from the main housing to the handlebar structure are dampened by the second damper elements;

wherein the electric motor is simultaneously powered by two rechargeable batteries, connected in parallel to each other and accommodated together in the main housing, wherein the electronic control system comprises a device for generating current supplied to the motor, configured to use a first battery of the batteries for generating a first phase of a three-phase current, a second battery of the batteries for generating a second phase of the three-phase current, and both first and second batteries for generating a third phase of the three-phase current, wherein a ratio of contributions of the first battery and second battery to generation of the third phase is determined depending on a residual charge state of the batteries, wherein a least charged battery contributes less to the generation of the third phase than a most charged battery.

* * * * *